United States Patent [19]
Emig et al.

[11] Patent Number: 5,039,173
[45] Date of Patent: Aug. 13, 1991

[54] BRAKE SYSTEM FOR VEHICLE COMBINATIONS

[75] Inventors: Reiner Emig, Tamm; Herbert Schramm, Leonberg-Hoefingen; Dieter Woerner, Pleidelsheim, all of Fed. Rep. of Germany

[73] Assignee: Robert Bosch GmbH, Stuttgart, Fed. Rep. of Germany

[21] Appl. No.: 452,670

[22] Filed: Dec. 19, 1989

[30] Foreign Application Priority Data

Mar. 10, 1989 [DE] Fed. Rep. of Germany ....... 3907762

[51] Int. Cl.$^5$ .............................................. B60T 13/68
[52] U.S. Cl. .......................................... 303/7; 303/20
[58] Field of Search .................. 188/112 A; 303/3, 7, 303/20

[56] References Cited

U.S. PATENT DOCUMENTS

| | | | |
|---|---|---|---|
| 3,486,799 | 12/1969 | Greentree | 303/7 |
| 3,599,073 | 8/1971 | Wilson | 307/48 X |
| 3,856,362 | 12/1974 | Howard | 188/112 A X |
| 4,232,910 | 11/1980 | Snyder | 303/7 X |
| 4,568,129 | 2/1986 | Stumpe | 303/7 |

FOREIGN PATENT DOCUMENTS 3703639 8/1988 Fed. Rep. of Germany .

*Primary Examiner*—Robert J. Oberleitner
*Assistant Examiner*—Alfred Muratori
*Attorney, Agent, or Firm*—Edwin E. Greigg; Ronald E. Greigg

[57] ABSTRACT

The brake system having an electrically controllable brake apparatus of a trailer, the brake apparatus includes a control unit which is connected via electrical lines to an electrical energy source of a tractor. In braking, electrical currents are brought about of such a magnitude as to cause severe voltage drops in long lines that the functional safety of the brake apparatus may be threatened. The brake apparatus therefore has an electrical energy storage device disposed on the trailer, which can be charged by an energy source of the tractor and can be discharged upon triggering of the brake apparatus of the trailer. Voltage drops in the relatively short lines between the energy storage device and the control unit are therefore minimum. The lines between the electrical energy source of the tractor and the energy storage device of the trailer are charged by only low charging currents. The voltage drop is therefore low despite the long line length.

10 Claims, 1 Drawing Sheet

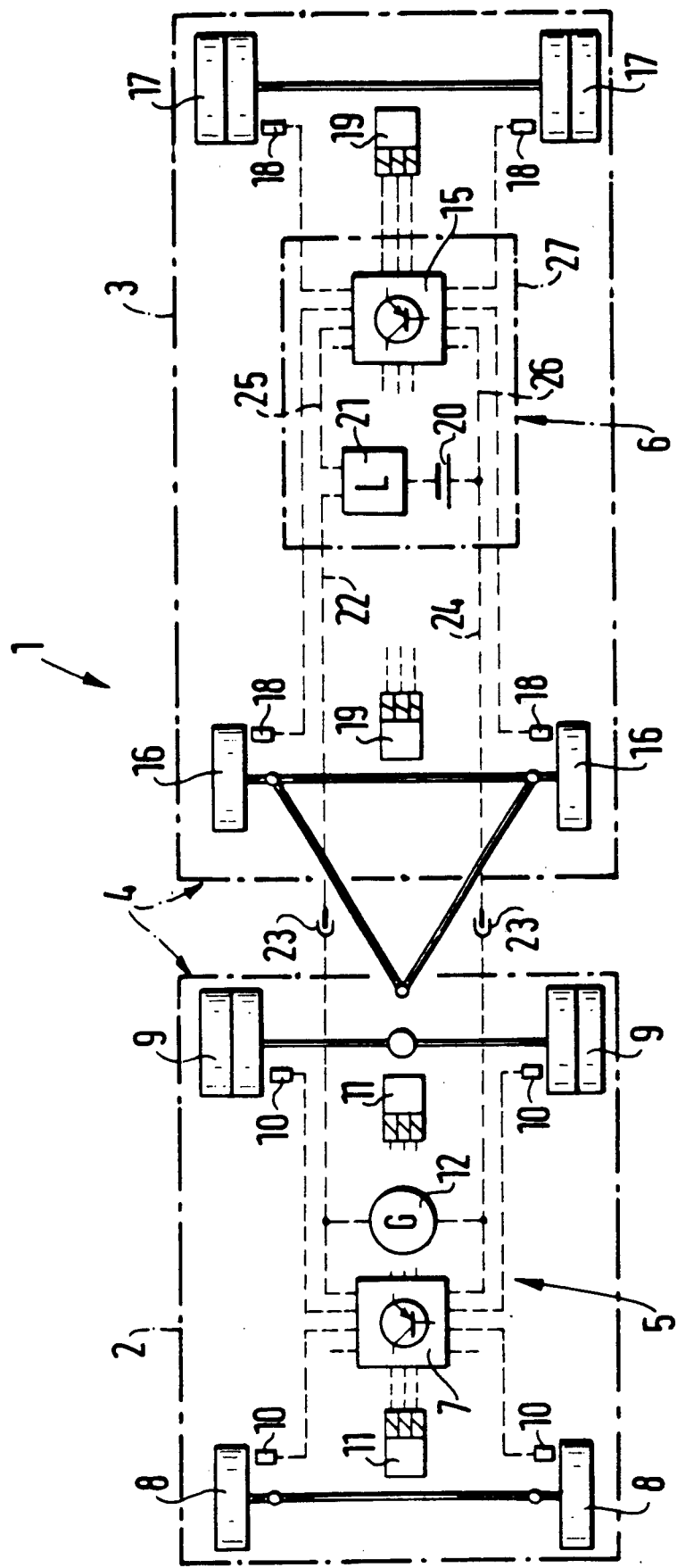

BRAKE SYSTEM FOR VEHICLE COMBINATIONS

BACKGROUND OF THE INVENTION

The invention is based on a brake system for vehicle combinations such as truck-trailers or tractor-trailers, as defined hereinafter. A brake system is already known (German Offenlegungsschrift 37 03 639) in which the electrical energy is supplied to the brake apparatus located in the trailer by the tractor. Because of the great length of the vehicle combination, the supply lines are quite long. When the brake apparatus comes into operation, relatively high currents flow in the lines between the tractor and the trailer. The line resistance causes a drop in voltage, which may impair safe operation of the brake apparatus, especially in the case of an anti-skid (ABS) and/or traction control system.

OBJECT AND SUMMARY OF THE INVENTION

The brake system according to the invention has an advantage over the prior art that in braking, the electrical currents flow through relatively short lines, so that the supply voltage between the energy storage device and the control unit of the brake apparatus undergoes only a slight voltage drop. This assures safe operation of the brake apparatus. During times when braking is not being done, the energy storage device can be charged. Because this time is much longer than the time of brake operation, the charging of the energy storage device can be done by the tractor energy source at low currents, resulting in a low voltage drop in the line between the tractor and the trailer. The line can therefore have a smaller cross section than in the brake apparatus of the prior art.

By means of the provisions disclosed herein, advantageous further features and improvements of the brake system disclosed are possible. It is particularly advantageous to provide a battery, in particular a lead accumulator, as the energy storage device. A charging and discharging device is associated with the energy storage device and is suitably likewise accommodated in the trailer. The energy storage device, the charging and discharging device, and the control unit are all disposed in a single housing.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing is a schematic illustration of an exemplary embodiment of the invention.

DESCRIPTION OF THE PREFERRED EMBODIMENT

A brake system 1 for a vehicle combination 4 comprising a tractor 2 and a trailer 3 has respective electrically controllable brake apparatuses 5 and 6 and an anti-skid (ABS) and/or traction control system. The brake apparatus 5 of the tractor 2 has a known electronic control unit 7, to which known sensors (rpm sensors) 10 associated with the wheels 8, 9 of the tractor 2 are connected in a manner shown in simplified form. Also connected to the control unit 7 are known brake fluid control valve units 11 for controlling the brake pressure in brake cylinders, not shown, associated with the vehicle wheels 8, 9. As a source 12 of electrical energy, a generator drivable by the vehicle engine, not shown, is likewise connected to the electronic control unit 7 of the tractor 2.

The brake apparatus 6 of the trailer 3 likewise has a known electronic control unit 15, to which, in a manner again shown in simplified form, known sensors (rpm sensors) 18 associated with the wheels 16 and 17 and known electrically controllable brake fluid control valve units 19 are connected to the wheel brake cylinders for controlling the brake pressure in the wheel cylinder not shown. The brake apparatus 6 of the trailer 3 has an energy storage device 20 in the form of a battery, for instance a lead battery, as its energy source. An electronic charging and discharging device 21 is connected in series with the energy reservoir 20. A line 22 leading to the energy source 12 of the tractor 2 is connected to the device 21 by a plug-in connection 23 between the two vehicles. A second line 24 communicating with the energy source 12 of the tractor 2 and likewise having a plug-in connection 23 between the vehicles leads to the energy storage device 20 of the trailer 3. Together with the energy storage device 12 of the tractor and the charging and discharging device 21 disposed in the trailer, the lines 22 and 24 form a charging circuit for the energy reservoir 20. The electronic control unit 15 of the trailer 3, with lines 25 and 26 connecting the charging and discharging device 21 and the energy storage device 20 form a discharging circuit for the energy reservoir. The lines 25 and 26 of the discharging circuit have a larger cross section than the lines 22 and 24 of the charging circuit because they carry a larger current load. The control unit 15 of the trailer 3, the energy storage device 20 and the charging and discharging device 21 are all disposed in a housing 27 on the trailer.

When the trailer 3 is braked, the energy required for operating the electronic control unit 15 and the brake fluid control valve units 19 is drawn from the energy storage device 20. In this process relatively high currents flow through the lines 25 and 26 of the discharging circuit. Because of the short length of these lines 25 and 26, the voltage drop is low, and the operation of the brake apparatus 6 is reliably assured. The capacity of the energy storage device 20 is dimensioned adequately for the load on the brake apparatus 6. The energy given up from the energy storage device 20 is compensated for, by the electrical energy source 12 of the tractor 2 via the lines 22 and 24 and the charging and discharging device 21 in the operating time of the vehicle combination 4 during which braking does not occur. Since the time without braking is very much longer than the time of braking operation, the energy storage device 20 can be recharged with low currents. The lines 22 and 24 accordingly carry only a low load and therefore have a small cross section, and thus only a slight voltage drop occurs at these lines.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A brake system for vehicle combinations, which comprises an electrically controllable fluid operated brake apparatus on a trailer, an electronic control unit

(15) and said trailer which is connectable via electrical conductor lines to an electrical energy source (12) of a tractor, said fluid operated brake apparatus (6) includes an electrical energy storage device (20) disposed on the trailer (3), said electrical energy storage device is chargeable via electrical conductor liens by said energy source (12) of the tractor (2) and is dischargeable upon triggering of the fluid operated brake apparatus (6) of the trailer for braking said trailer, and said electrical conductor lines between said electrical energy source (12) on said tractor and said electrical energy storage device (20) disposed on said trailer are much smaller in cross-section than conductor wires between said electrical energy storage device (20) and the brakes on said trailer.

2. A brake system as defined by claim 1, in which said energy storage device (20) is a battery.

3. A brake system as defined by claim 1, in which said electrically controllable fluid operated brake apparatus includes a charging and discharging device (21) on said trailer associated with the energy storage device (20) on the trailer.

4. A brake system as defined by claim 2, in which said electrically controllable fluid operated brake apparatus includes a charging and discharging device (21) on said trailer associated with the energy storage device (20) on the trailer.

5. A brake system as defined by claim 3, in which said energy storage device (20), said charging and discharging device (21) and said electronic control unit (15) are disposed in a housing (27) on the trailer (3).

6. A brake system as defined by claim 4, in which said energy storage device (20), said charging and discharging device (21) and said electronic,,control unit (15) are disposed in a housing (27) on the trailer.

7. A brake system as defined by claim 5, which includes electrically controlled brake fluid control valve units (19) on said trailer which are operated by said electronic control unit for applying brakes and for ABS operation.

8. A brake system as defined by claim 6, which includes electrically controlled brake fluid control valve units (19) on said trailer which are operated by said electronic control unit for applying brakes and for ABS operation.

9. A brake system as set forth in claim 1, in which said brake apparatus is air operated.

10. A brake system as set forth in claim 1, in which said brake apparatus is hydraulic fluid operated.

* * * * *